(12) United States Patent
Jayasinha (10) Patent No.: US 9,130,644 B2
(45) Date of Patent: Sep. 8, 2015

(54) POWER BOOSTER IN AN MEO SETTING

(71) Applicant: EMC SatCom Technologies, LLC, Miami, FL (US)

(72) Inventor: Sriram Jayasinha, Bangalore (IN)

(73) Assignee: EMC SatCom Technologies, LLC, Miami, FL (US)

( * ) Notice: Subject to any disclaimer, the term of this patent is extended or adjusted under 35 U.S.C. 154(b) by 132 days.

(21) Appl. No.: 13/834,960

(22) Filed: Mar. 15, 2013

(65) Prior Publication Data

US 2014/0273815 A1    Sep. 18, 2014

(51) Int. Cl.
*H04W 4/00* (2009.01)
*H04B 7/185* (2006.01)
*H04B 7/195* (2006.01)

(52) U.S. Cl.
CPC .......... *H04B 7/18521* (2013.01); *H04B 7/1858* (2013.01); *H04B 7/195* (2013.01)

(58) Field of Classification Search
CPC ............. H04B 7/18513; H04B 10/118; H04B 7/18521; H04B 7/18534; H04B 7/18541; G01S 19/01; G01S 19/51
USPC .............................. 455/12.1, 436, 3.02, 277.1
See application file for complete search history.

(56) References Cited

U.S. PATENT DOCUMENTS

| 6,073,020 | A | 6/2000 | Andresen |
| 7,522,877 | B1 | 4/2009 | Avellan et al. |
| 7,570,949 | B1* | 8/2009 | Minerath ...................... 455/436 |
| 7,907,894 | B2 | 3/2011 | Avellan et al. |
| 2007/0135040 | A1* | 6/2007 | Draim ......................... 455/12.1 |

FOREIGN PATENT DOCUMENTS

| JP | 2001069058 A | 3/2001 |
| JP | 2006279558 A | 10/2006 |
| WO | WO-2006105316 A2 | 10/2006 |

OTHER PUBLICATIONS

P. K. Chowdhury et al. "Handover Schemes in Satellite Networks: State-of-the-Art and Future Research Directions," Communications Surveys & Tutorials, IEEE, 2006, pp. 1-13.
European Search Report dated Jul. 11, 2014 issued in European Patent Application No. 14159543.9.

* cited by examiner

*Primary Examiner* — Tu X Nguyen
(74) *Attorney, Agent, or Firm* — Blank Rome LLP (57) ABSTRACT

A customer satellite terminal provides seamless hand-off from a descending satellite to an ascending satellite in an equatorial MEO constellation at RF. The hand-off from the descending satellite to the ascending satellite is conducted when the propagation delay from the ascending satellite and the descending satellite are equal, by aligning first and second amplitudes, first and second frequency offsets, and first and second phases.

20 Claims, 6 Drawing Sheets

POWER BOOSTER IN AN MEO SETTING

BACKGROUND OF THE INVENTION

1. Field of the Invention

The present invention relates to equatorial Medium Earth Orbit (MEO) satellite constellation hand-off and diversity-combining by earth-station antenna receivers.

2. Background of the Related Art

The O3b Satellite Constellation consists of 8 equatorial orbit satellites (soon expanding to 16 satellites, then 24 satellites) owned by O3b Networks, Ltd, and deployed at a MEO altitude of about 8063 km. Relative to a fixed point on earth, all satellites trace an identical arc across the sky; customers and Teleports use antennas to track the satellites and maintain network connectivity. O3b Satellites serve terrestrial regions within ±45 degrees latitude using steered antennas.

Due to the satellites' orbital spacing, there is a period when two satellites are both visible to both the Teleport and its Customers ("dual satellite access period"). A portion of the dual satellite access period is a pre-planned "hand-off duration".

Customer Terminals are in contact with at least one satellite. Maintaining contact requires a two antenna configuration: one (or both) for link use in the inter-hand-off interval, the other, during hand-off, pre-positioned to acquire an ascending satellite.

O3b has described using switching off-the-shelf modems' outputs to achieve hand-off using make-before-break and break-before-make strategies and for managing the resulting duplication or elimination of packets by higher levels in the protocol stack.

To protect the integrity of data, TCP packets have sequence numbers, timestamps, flow-control, congestion control and checksums. During TCP exchanges, ACK and NACK packet types inform the sender whether packets were received. Clearly, in the break-before-make approach, packet re-transmission becomes necessary. This causes the conventional congestion control process that uses ACKs and NACKs vis-a-vis timers to throttle back data fed to the network and increasing latency. A make-before-break approach can ensure that packets are not lost due to switching. However, it is desirable to perform the hand-off at the physical layer in order to eliminate duplication of equipment, overhead and latency.

SUMMARY OF THE INVENTION

The present invention employs the terminal aperture optimally by integrating hand-off (described briefly below) and 2-antenna diversity. It implements a physical layer hand-off process that is transparent to higher levels of the protocol stack. The invention utilizes the following information at a terminal as an input to its hand-off/antenna diversity device: (1) Satellite Ephemeris/GPS (used for accurate antenna tracking and to equalize (by program) delays/Doppler in hand-off/antenna diversity device); (2) Schedule updates (used to re-define constellation use in the event of a upgrade/failure); (3) Software/firmware updates (algorithm upgrades to modems, antenna controllers, and hand-off/antenna diversity device); and (4) Generic System Messaging (a free form message type for outage notifications and other uses).

A micro-controller (in the hand-off/antenna diversity device) receives these inputs and distributes it, as appropriate, to other components of the hand-off/antenna diversity device. This information is used to ensure that low-cost off-the-shelf modems can be used in conjunction with the bandwidth scalable hand-off/antenna diversity device.

In summary, the advantages of the present technical approach include: (a) use the technology (with insignificant increase in complexity and cost) to provide seam-less hand-off at RF (thereby eliminating latency enhancing software changes in higher levels of the protocol stack); (b) optimally use available terminal aperture using antenna diversity combining; (c) optimally use system information available (with small increase in complexity and cost) at the terminal site to enable off-the-shelf modem use across all customer tiers; and (d) manufacture several bandwidth-scalable hand-off/antenna diversity devices to address the cost requirements of all customer tiers.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Figure 3:
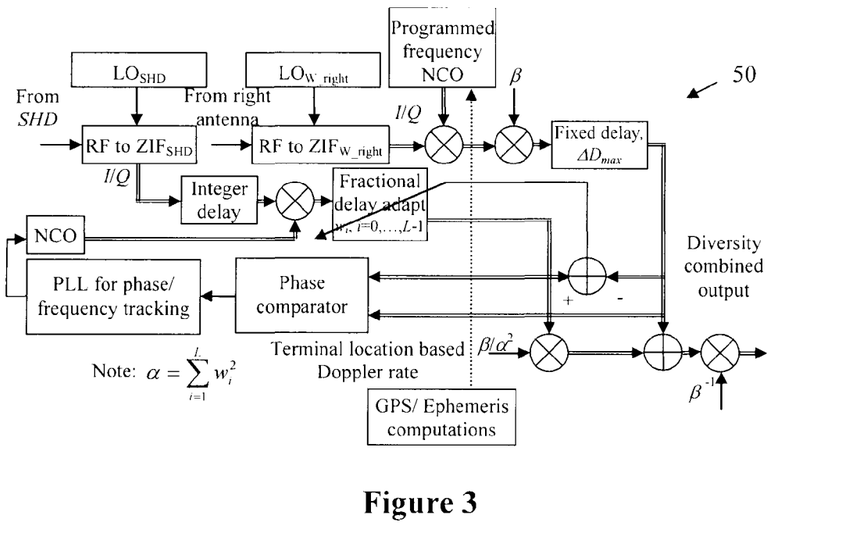
FIG. 3 shows the 2-antenna diversity combiner.
Figure 4:
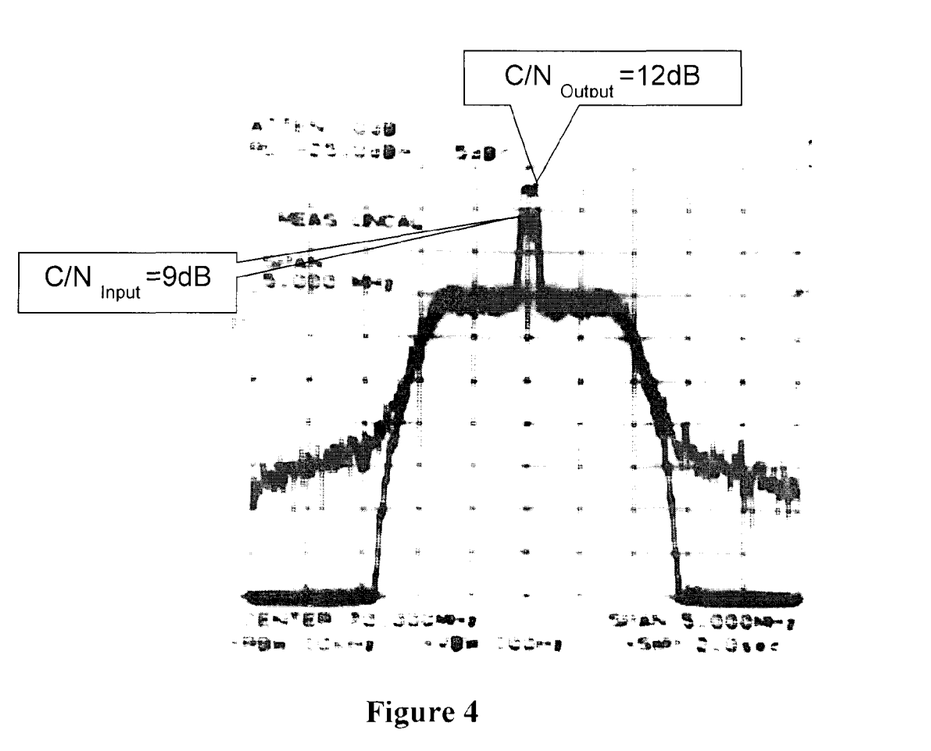
FIG. 4 shows the improvement of S/N as a result of diversity combining.

Referring to the drawings, FIGS. 1(a)-1(d) show the satellite hand-off system and method of the present invention. The invention is implemented at customer terminals 10, 20 in communication with O3b satellites 5, 7. The customer terminals 10, 20 each include a controller 12, 22 that implements the antenna 14, 24 pointing for hand-off control and other operations in accordance with the present invention. Or, a single controller can be provided to operate both of the antennas 14, 24. The customer terminals 10, 20 feed the signals received from satellites to a satellite hand-off device (SHD) 30 (FIGS. 2, 4) and a diversity combiner (DC) 50 (FIGS. 3, 4). The SHD 30 and diversity-combiner 50 can be integrated with the controllers 12, 22, or can be separate devices that are in communication with the controllers 12, 22.

Figure 2A:
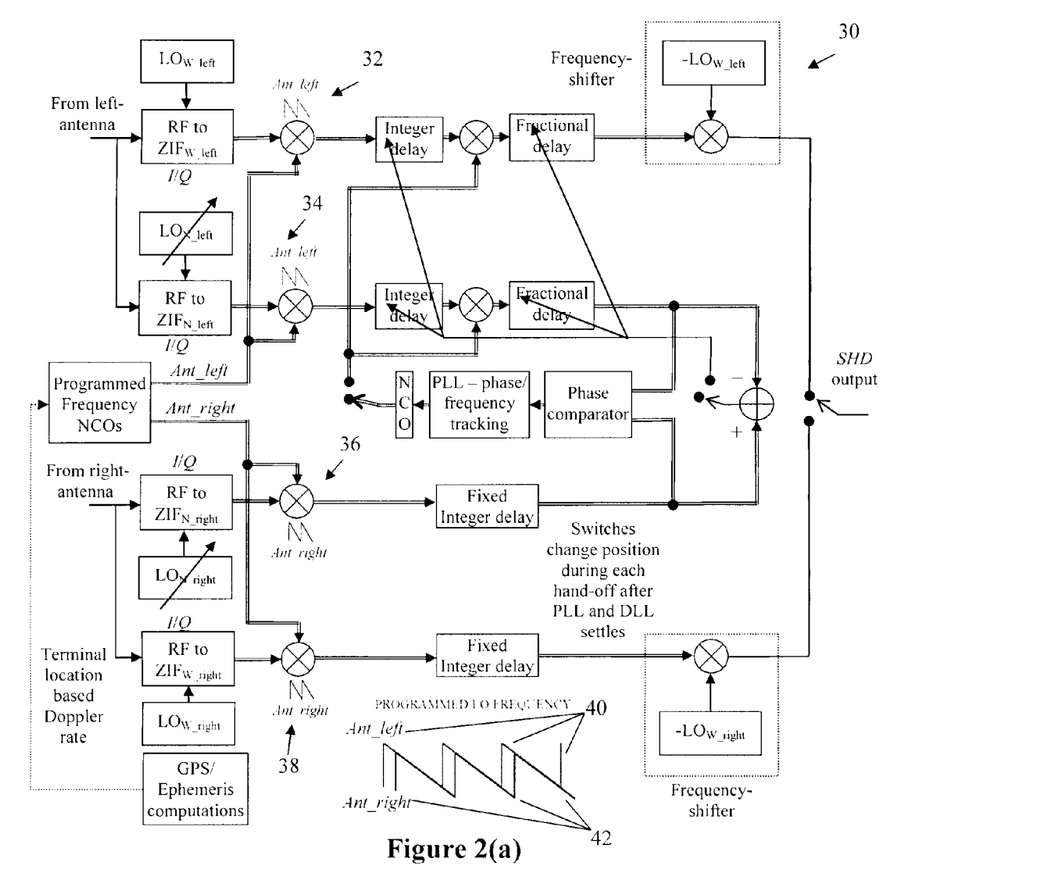
FIG. 2(a) shows the satellite hand-off device at teleport.

The controller 12, 22—as well as the SHD 30 (FIG. 2(a)) and the diversity combiner 50 (FIG. 3)—is a computing device, such as a processor with computer software that permits the accessing of data from an electronic information source. The controller 12, 22 can also incorporate the SHD 30 and diversity combiner 50. The software and the information in accordance with the invention may be within a single, free-standing computer or it may be in a central computer networked to a group of other computers or other electronic devices. The software and data may be stored in a storage device, such as a database, memory, computer hard drive, or other appropriate data storage device. Unless otherwise stated, the steps performed herein are all performed automatically in real-time by the processor, without manual interaction.

Antenna Coordination

The SHD 30 and DC 50 control the sequence of antenna movements described below. The antenna movements are coordinated by the master controller's (MC) timing information and the antenna control unit (ACU).

Figures 1A, 1B:
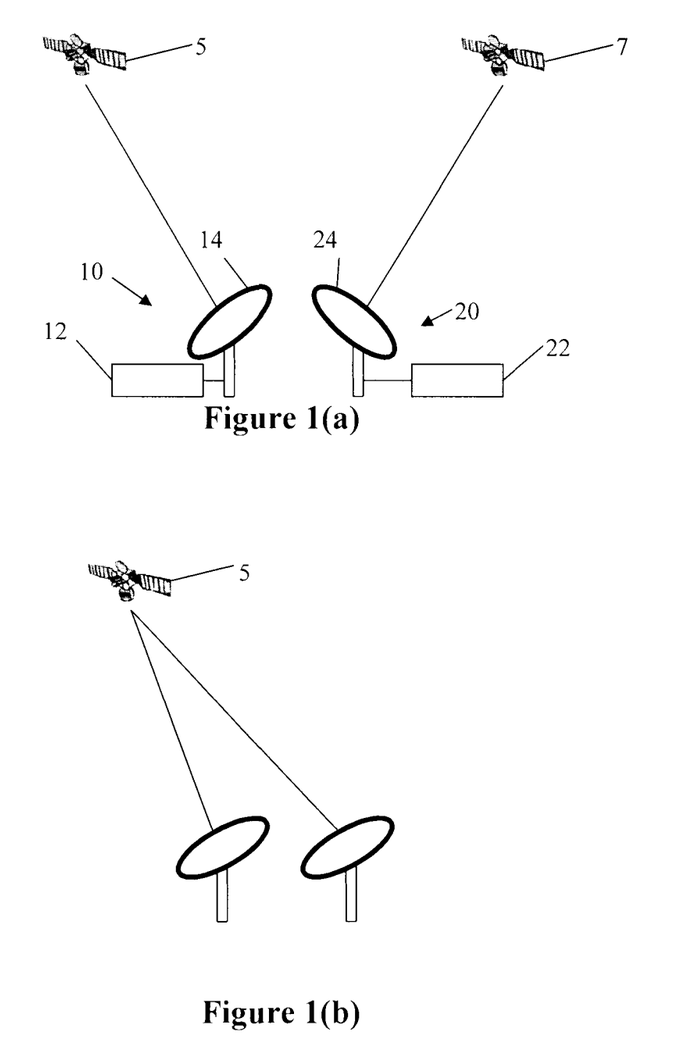
FIGS. 1(a)-(d) show the system in accordance with the preferred embodiment of the invention with two teleport antennas tracking movement of the satellites including hand-off.
Figure 1C:
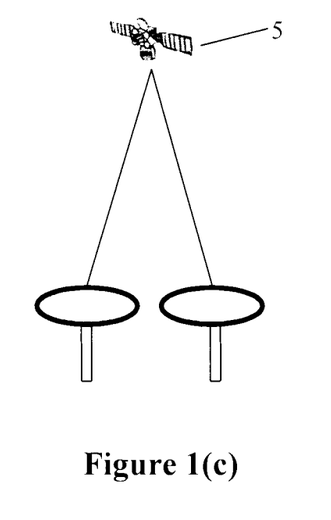
Figure 1D:
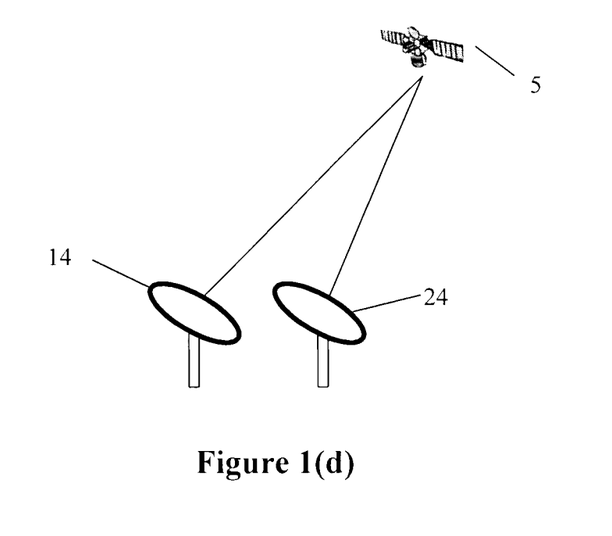

FIG. 1(*a*) shows hand-off (SHD) from the right antenna 24/descending satellite 7 to the left antenna 14/ascending satellite 5. Hand-off occurs when signals received from both satellites 5, 7 have equal path (i.e., propagation) delay (differing by about 6-7 ns, plus any buffer delays) from the transmitter to the receiving terminal. Hand-off time depends on both teleport and remote coordinates. As the satellites 5, 7 continue to move, at FIG. 1(*b*), the right antenna 24 points (by operation of the controller 12) in the same direction as the left antenna 14 on the ascending satellite 5 and acquires it. The time for this acquisition is only based on the teleport antenna locations. Service incorporates both antennas. FIG. 1(*c*) shows that both antennas 10, 20 track the satellite 5 as it continues in its orbit. At FIG. 1(*d*), the left antenna 14 will drop its signal with the current satellite 5 and begin to move to find a new ascending satellite.

It should be noted that this is one example of antenna co-ordination and that other antenna co-ordinations using satellite hand-off and diversity combing are possible. For example, an alternative embodiment is to perform diversity-combining instead of the switch for the remainder of the dual-satellite access period and then move the right antenna 24 at the completion of the dual-satellite access period to point in the same direction of the left antenna 14 in order to do diversity combining. This antenna coordination is more complex, and could be implemented based on time taken to move the right antenna 24. However, the value of diversity combining is greater when the satellite is far from the zenith.

Satellite Hand-Off Device (SHD)

The function of the SHD 30 is to align the time, amplitude, Doppler and phase of the ascending satellite 5 with that of descending satellite 7, so that a seamless hand-off can be made from descending 7 to the ascending 5 satellite. The ascending satellite 5 has an apparent motion towards the earth station, while the descending satellite 7 has the motion away from the earth station (as the earth station is located on the surface of the earth, not its centre). Thus, the signals received from left and right antennas 14, 24 (when pointing to ascending and descending satellites 5, 7) have positive and negative Doppler.

The two inputs to FIG. 2(*a*) are the left and right antenna signals. The frequency-shifter, shown in both the left and right antenna paths of FIG. 2, centers the selected remote spectrum to be in the center of the band (70 MHz or 140 MHz or a selected region of L-band).

This frequency shift is undone on the selected output of the SHD 30. After conversion to (nominally) zero-IF, these signals are mixed with linearly-frequency modulated (LFM) references indicated by the two saw-tooth waveforms 40, 42. The mixers 32, 34, 36 and 38 transform the positive and negative Doppler in left and right antenna signals into near constant Doppler as seen by the SHD.

Figure 2B:
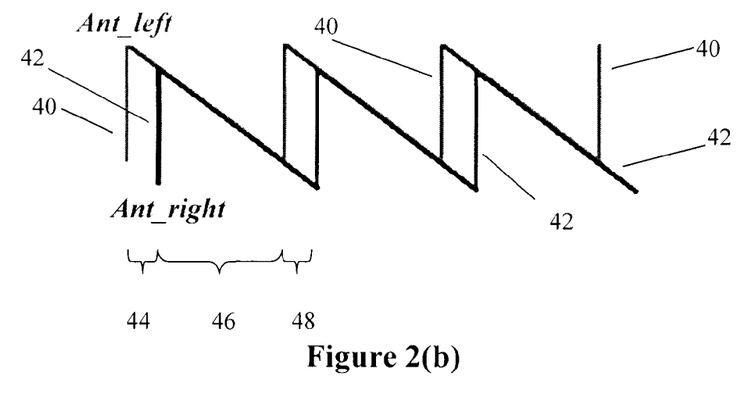
FIG. 2(b) shows the signals of FIG. 2(a) in greater detail.

As can be seen in the combined saw-tooth waveforms, the two signals 40, 42 (FIG. 2(*b*)) are the same in frequency but are differently initialized. The non-overlapped section 44 and 48 of the signal 40 is after hand-off FIGS. 1(*a*) to 1(*b*), the overlapped section 46 of signals 40, 42 is during diversity combining FIGS. 1(*b*) to 1(*d*) and the non-overlapped section 44, 48 of signal 42 is when the diversity combining stops for a new hand-off FIG. 1(*d*) to FIG. 1(*a*) to repeat another cycle. As a result of the mixing, the signals received from the ascending and descending satellites 5, 7 do not have a frequency difference that cannot be compensated by the SHD 30 and/or the diversity-combiner 50. Typically, remote terminals receive a single TDMA wider bandwidth signal and teleports (hubs) receive signals from several remote terminals of narrower bandwidth SCPC. The hand-off condition for the remote is that the path delay of wideband signal received from both satellites 5, 7 is substantially or nearly the same (differing by approximately 6-7 ns), and to account for at least any buffer delay.

At the hub, one of the narrow SCPC signal from a remote, which is in the center of the satellite footprint, is selected as a reference for determining the hand-off condition. The blocks with suffix W (denoting Wideband) are configured for operating with configured bandwidth. The blocks with suffix N (denoting Narrow) are configured for operating on a selected narrow bandwidth carrier in multi-carrier scenario, where seamless hand-off is only possible for one of the remotes. For other remotes, the reference remote's time and frequency is only approximately accurate. In accordance with the discussion below, FIG. 2(*a*) operates in to align the time, frequency, phase and amplitude of right and left antenna signals and enables the hand-off from descending satellite 7 to the ascending satellite 5. This can be conducted in any suitable manner, such as discussed in U.S. Pat. Nos. 7,522,877 and 7,907,894, the entire contents of which is hereby incorporated by reference.

Diversity Combiner (DC)

Once the SHD 30 hands-off the signal from right antenna 24 to the left antenna 14, the right antenna 24 is idle. The present invention steers the idle antenna 24 after hand-off to point to the ascending antenna 5, to coherently combine both left and right antenna signals. For equal signals that add coherently and equal variance noises that superpose incoherently, a 3 dB gain in signal to noise ratio results. Accordingly, after hand-off, both the left and right antennas 14, 24 are pointing to the ascending satellite 5 and their apertures can be coherently combined.

A schematic implementing two-antenna maximum ratio diversity combining 50 is shown in FIG. 3. The program Doppler block is explained in SHD. Before coherent combining can take place, the diversity combiner 50 acquires the delay shift (nearly zero), the phase and any residual frequency offset (this can happen as there are separate down-converters for the two antenna paths). Diversity combining can occur in accordance with any suitable technique, such as the system and process of U.S. Pat. No. 7,907,894, the entire contents of which is hereby incorporated by reference.

As there is no programmed delay, the output of the DC 50 has a delay variation of 56 ms over the 30 minute satellite pass from being an ascending satellite to a descending satellite, which can be tolerated by the modem. However, the Programmed Doppler is also applied to the right antenna so that the Diversity combined output has no Doppler variations. An MRRC diversity combiner is used (as the signal levels between the two antennas can vary based on their distance of separation and rain rate). The parameters of the MRRC are $\alpha$ and $\beta$ shown in FIG. 3. FIG. 4 shows the improvement of S/N as a result of diversity combining.

Figure 5:
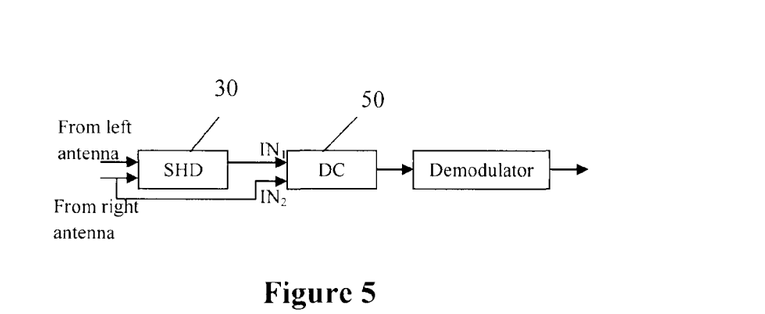
FIG. 5 is a system diagram with the satellite hand-off device, diversity combiner and off-the-shelf demodulator.

FIG. 5 shows the system diagram with the Satellite Hand-off Device (SHD) 30 and the Diversity Combiner (DC) 50 and an off-the-shelf demodulator. They operate in the following modes corresponding to antenna coordination. With respect to FIG. 1(a), the SHD output is from the right (descending satellite 7) antenna 24 (before hand-off) and from the left (ascending satellite 5) antenna 14 (after hand-off). The DC 50 output is IN2 bypass (before hand-off from right antenna to left antenna) and IN1 bypass (after hand-off from right antenna to left antenna).

After hand-off, turning to FIG. 1(b), the right antenna 24 joins the left antenna 14 on the ascending satellite 5 for coherent combining. The SHD output is from the left antenna. The DC 50 output is IN1 bypass (before right antenna joins left antenna) and the coherently combined output (after right antenna points to the same satellite as the left antenna).

Both antennas continue to track the ascending satellite, as in FIG. 1(c). The SHD output is from the left antenna and the DC output is the coherently combined signal.

To prepare for a new hand-off, at FIG. 1(d), the left antenna begins to move to find the ascending satellite. Before left antenna 14 leaves right antenna 24, the SHD output is from the left antenna and the DC output is the coherently combined signal. After left antenna leaves right antenna, the SHD output is from the right antenna and the DC output is IN2 bypass.

Figure 6:
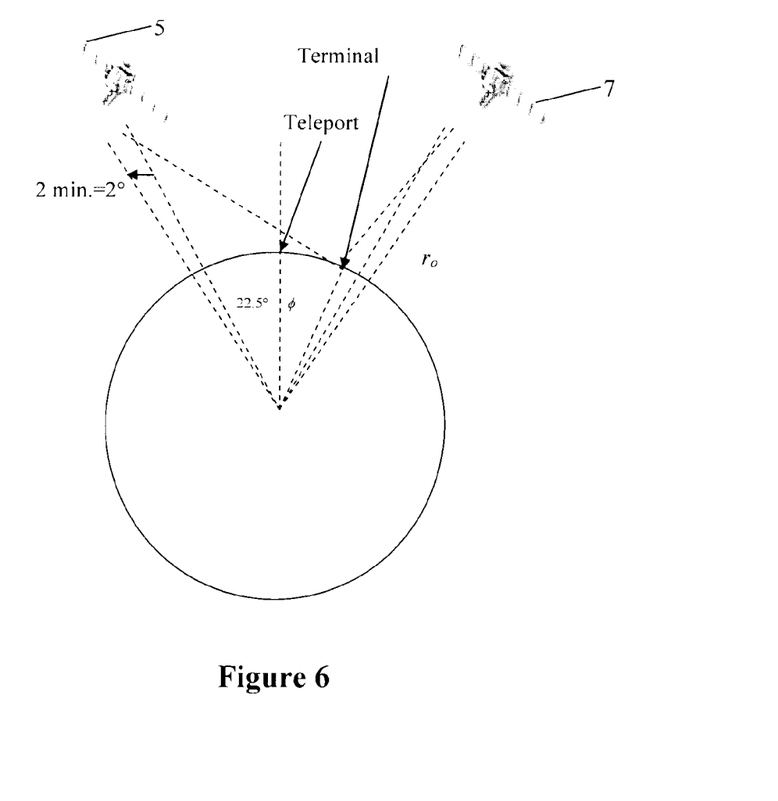
FIG. 6 illustrates the hand-off for an equatorial terminal.

FIG. 6, illustrates the hand-off for an equatorial terminal. For teleports exactly spaced 45° apart, hand-off occurs at a differential delay $\delta=(1/c)\times\{(r_o^2+r_e^2-2r_o r_e \cos(22.5°+\phi))^{1/2} - (r_o^2+r_e^2-2r_o r_e \cos(22.5°-\phi))^{1/2}\}$, $|\phi|\leq 22.5°$, where $r_e$ and $r_e$ are earth and orbital radii respectively. The output delay on closer satellite=$\delta$, so that modem has no missing or duplicate data. This is just illustrative; generally, $\delta$ is based on terminal and teleport position (actual calculations also take latitude into account).

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A customer satellite terminal for providing seamless hand-off from a descending satellite to an ascending satellite in an equatorial MEO constellation at RF, the satellite terminal comprising:
a processing device configured to receive a first satellite signal from the descending satellite and a second satellite signal from the ascending satellite, the first satellite signal having a first amplitude, first frequency offset, and first phase and the second satellite signal having a second amplitude, second frequency offset, and second phase;
said processing device further configured to conduct a hand-off from the descending satellite to the ascending satellite when the propagation delay from the ascending satellite and the descending satellite are equal, by aligning first and second amplitudes, first and second frequency offsets, and first and second phases;
said aligning process includes subtraction on time, amplitude, frequency and phase aligned signals and combining on the time, frequency and phase aligned signals.

2. The terminal of claim 1, wherein once the seamless hand-off is finished, the terminal further provides a signal boost of up to 3 dB by steering the idle antenna from descending satellite to the ascending satellite and by diversity combining the signals received by both antennas from ascending satellite.

3. The terminal of claim 2, wherein said signal boost is stopped when the new hand-off window approaches.

4. The terminal of claim 3, wherein a tracking antenna is then moved once again to acquire the ascending satellite and achieve a next seamless switch.

5. The terminal of claim 2, wherein said signal boost is present for a duration of the ascending satellite's pass in the sky until it becomes a descending satellite.

6. The terminal of claim 5, wherein an idle earth station antenna is utilized to minimize power and/or maximize throughput for a set of assets already deployed.

7. The terminal of claim 1, wherein a positive Doppler in the ascending satellite signal is provided, while there is a negative Doppler in the descending satellite signal.

8. The terminal of claim 1, wherein a received signal is mixed with linear frequency modulated (LFM) signal to ensure that the satellite signal has nearly constant Doppler through its pass.

9. The terminal of claim 8, further comprising off-the-shelf demodulators.

10. A customer satellite terminal for providing seamless hand-off from an ascending satellite to a descending satellite in an equatorial MEO constellation, the satellite terminal comprising:
a processing device configured to receive a first satellite signal from the ascending satellite and a second satellite signal from the descending satellite, the first satellite signal having a first amplitude, first frequency offset, and first phase and the second satellite signal having a second amplitude, second frequency offset, and second phase;
said processing device further configured to conduct a hand-off from the descending satellite to the ascending satellite when the first and second amplitudes, first and second frequency offsets, and first and second phases are all aligned.

11. The terminal of claim 10, wherein propagation delay from the ascending satellite and the descending satellite are equal when the first and second amplitudes, first and second frequency offsets, and first and second phases are all aligned.

12. The terminal of claim 10, wherein the hand-off is seamless.

13. The terminal of claim 10, further comprising a first antenna communicating with the ascending satellite and a second antenna communicating with the descending satellite, wherein following the hand-off said processing device determines that the second antenna is idle and controls the second antenna to point to the ascending satellite.

14. The terminal of claim 13, wherein the first and second antennas together provide a signal to noise boost of approximately 2.75 to 3 dB.

15. The terminal of claim 14, wherein following hand off, said processor controls the first antenna to point to the ascending satellite until it becomes a descending satellite.

16. The terminal of claim 14, wherein said processor controls said first and second antennas to minimize power and/or maximize throughput.

17. The terminal of claim 16, wherein after the ascending satellite becomes a descending satellite, said processor controls the first antenna to acquire a new ascending satellite.

18. The terminal of claim 10, wherein the ascending satellite has an apparent motion towards said terminal, and the descending satellite has an apparent motion away from the earth station.

19. The terminal of claim 10, wherein said terminal is an earth station located on the surface of the earth, not its centre.

20. The terminal of claim 10, wherein there is a positive Doppler in the first satellite signal, and a negative Doppler in the second satellite signal, and wherein said processor is configured to mix a linear frequency modulated (LFM) signal to provide the satellite signal with a nearly constant Doppler through its pass.

\* \* \* \* \*

UNITED STATES PATENT AND TRADEMARK OFFICE
CERTIFICATE OF CORRECTION

| | | |
|---|---|---|
| PATENT NO. | : 9,130,644 B2 | Page 1 of 1 |
| APPLICATION NO. | : 13/834960 | |
| DATED | : September 8, 2015 | |
| INVENTOR(S) | : Sriram Jayasimha | |

It is certified that error appears in the above-identified patent and that said Letters Patent is hereby corrected as shown below:

Title Page, Item (72) please correct the inventor's name as follows:

delete "Sriram Jayasinha" and insert --Sriram Jayasimha--.

Signed and Sealed this
Fifth Day of July, 2016

Michelle K. Lee
*Director of the United States Patent and Trademark Office*